(12) United States Patent
O'Leary et al.

(10) Patent No.: US 7,445,416 B2
(45) Date of Patent: Nov. 4, 2008

(54) WHEELCHAIR LIFT WITH SLIDABLE SUPPORT ARM

(75) Inventors: Neil O'Leary, Tempe, AZ (US); Michael J. Schmidt, Queen Creek, AZ (US); Terrence Miller, Gilbert, AZ (US)

(73) Assignee: Ricon Corp., Panorama City, CA (US)

( * ) Notice: Subject to any disclaimer, the term of this patent is extended or adjusted under 35 U.S.C. 154(b) by 70 days.

(21) Appl. No.: 11/347,696

(22) Filed: Feb. 3, 2006

(65) Prior Publication Data

US 2007/0183881 A1 Aug. 9, 2007

(51) Int. Cl.
*B60P 1/44* (2006.01)

(52) U.S. Cl. ...................... 414/546; 414/921

(58) Field of Classification Search ............. 414/921; 187/200
See application file for complete search history.

(56) References Cited

U.S. PATENT DOCUMENTS

| | | | | |
|---|---|---|---|---|
| 4,015,725 | A | * | 4/1977 | Ryan et al. ............ 414/539 |
| 4,140,230 | A | * | 2/1979 | Pearson ............... 414/546 |
| 4,252,491 | A | * | 2/1981 | Hock ................. 414/540 |
| 4,534,450 | A | | 8/1985 | Savaria |
| 4,808,056 | A | * | 2/1989 | Oshima ............... 414/462 |
| 5,228,539 | A | | 7/1993 | Wertheim |
| 5,234,311 | A | | 8/1993 | Lodhua, Jr. |
| 5,253,973 | A | | 10/1993 | Fretwell |
| 5,308,215 | A | | 5/1994 | Saucier |
| 5,373,915 | A | | 12/1994 | Tremblay |
| 5,393,192 | A | | 2/1995 | Hall |
| 5,401,135 | A | * | 3/1995 | Stoen et al. ........... 414/546 |
| 5,428,615 | A | | 6/1995 | Backes et al. |
| 5,445,488 | A | | 8/1995 | Saucier |
| 5,542,811 | A | * | 8/1996 | Vartanian ............. 414/541 |
| 5,556,250 | A | | 9/1996 | Fretwell |
| 5,564,884 | A | * | 10/1996 | Farsai ................ 414/540 |
| 5,605,431 | A | | 2/1997 | Saucier |
| 5,636,399 | A | | 6/1997 | Tremblay |
| 5,672,041 | A | * | 9/1997 | Ringdahl et al. ........ 414/545 |
| 5,676,515 | A | | 10/1997 | Haustein |
| 5,832,555 | A | | 11/1998 | Saucier |
| 5,944,473 | A | | 8/1999 | Saucier |
| 6,042,327 | A | | 3/2000 | Deleo |
| 6,043,741 | A | | 3/2000 | Whitmarsh |

(Continued)

FOREIGN PATENT DOCUMENTS

CA 1141713 2/1983

(Continued)

*Primary Examiner*—James Keenan
(74) *Attorney, Agent, or Firm*—The Webb Law Firm

(57) ABSTRACT

A wheelchair lift for use in conjunction with a vehicle having a floor. The lift includes a power actuating system, a platform assembly having first and second platform sections, and a linking assembly connecting the power actuating system to the platform assembly. The linking assembly includes first and second vertical arms connected to the platform assembly. The platform assembly is movable between a fully extended configuration, a pre-stowed position and a stowed position. The first and second vertical arms are a first distance apart when the platform assembly is in the fully extended configuration and the pre-stowed position and a second distance apart when the platform assembly is in the stowed position. The second distance is less than the first distance.

6 Claims, 5 Drawing Sheets

U.S. PATENT DOCUMENTS

| | | | |
|---|---|---|---|
| 6,062,805 | A | 5/2000 | Tremblay |
| 6,086,314 | A * | 7/2000 | Savaria ...................... 414/546 |
| 6,102,648 | A | 8/2000 | Fretwell |
| 6,173,737 | B1 | 1/2001 | Saucier |
| 6,179,545 | B1 | 1/2001 | Petersen, Jr. |
| 6,203,266 | B1 | 3/2001 | Savaria |
| 6,236,905 | B1 | 5/2001 | Whitmarsh |
| 6,293,748 | B1 * | 9/2001 | Savaria ...................... 414/537 |
| 6,379,102 | B1 | 4/2002 | Kameda |
| 6,585,474 | B1 | 7/2003 | Kameda |
| 6,698,998 | B2 | 3/2004 | Koretsky |
| 6,802,095 | B1 | 10/2004 | Whitmarsh |
| 6,971,967 | B2 | 12/2005 | Whitmarsh |
| 7,001,132 | B2 | 2/2006 | Koretsky |
| 2004/0028513 | A1 * | 2/2004 | Reynolds .................... 414/546 |

FOREIGN PATENT DOCUMENTS

| | | |
|---|---|---|
| EP | 0629524 | 12/1994 |
| GB | 2224992 | 5/1990 |

* cited by examiner

WHEELCHAIR LIFT WITH SLIDABLE SUPPORT ARM

FIELD OF THE INVENTION

The present invention relates to a lift assembly for aiding users of wheelchairs to get into and out of a van or the like.

BACKGROUND OF THE INVENTION

A lift assembly of this type comprises a platform laterally supported by an armature and carried from a vertical stored position inside the vehicle to a horizontal position exteriorly of the vehicle and level with the vehicle floor and to a ground position.

The user wheels himself onto the platform and actuates means to displace the platform from the vehicle level to the ground or inversely.

This type of known lift assembly (see U.S. Pat. No. 3,651,965 dated May 28, 1972 to Clever Industries) is stored in the vehicle but uses a relatively large percentage of the floor area and, moreover, the platform 4, when in stored position, obstructs the door opening, thus preventing a non-invalid person from using it. Also, the hydraulic systems used to raise or lower the platform are generally bulky and complex.

Other types of lifts have attempted to solve these problems. See, for example, U.S. Pat. Nos. 6,802,095, 6,379,102, 6,585,474, 6,086,314, 6,062,805, 5,944,473, 5,605,431, 5,556,250, 5,445,488, all of which are incorporated herein in their entireties by reference.

Therefore, a need exists for a lift assembly mounted in a vehicle and foldable into a compact position within the latter.

SUMMARY OF THE INVENTION

In accordance with a preferred embodiment of the present invention there is provided a wheelchair lift for use in conjunction with a vehicle having a floor. The lift includes a power actuating system, a platform assembly having first and second platform sections, and a linking assembly connecting the power actuating system to the platform assembly. The linking assembly includes first and second vertical arms connected to the platform assembly. The platform assembly is movable between a fully extended configuration, a pre-stowed position and a stowed position. The first and second vertical arms are a first distance apart when the platform assembly is in the fully extended configuration and the pre-stowed position and a second distance apart when the platform assembly is in the stowed position. The second distance is less than the first distance. In a preferred embodiment, the second vertical arm is movable inwardly toward the first vertical arm along a horizontal path. Preferably the first and second platform sections are adjacent to one another when the platform assembly is in the stowed position.

In accordance with another preferred embodiment of the present invention there is provided a wheelchair lift for use in conjunction with a vehicle having a floor and a door opening. The lift includes an anchoring plate fixedly secured to the floor inwardly of the door opening, a platform movable between an upstanding stowed position and an upstanding pre-stowed position inside the vehicle, and a pair of vertical arms pivotally connecting the platform to the anchoring plate. At least one of the arms is movable in a horizontal direction. The platform is further pivotal relative to the anchoring plate between the upstanding pre-stowed position and an outside floor level position, and is movable from that position to a ground level position and inversely. The platform includes first and second platform sections movable between a position where they lie in the same plane to form a flat surface and a stowed position where they do not lie in the same plane.

In accordance with yet another preferred embodiment of the present invention there is provided a method of stowing a wheelchair lift. The method includes the steps of providing a wheelchair lift having a power actuating system, a platform assembly and a linking assembly with two vertical arms connecting the power actuating system to the platform assembly, moving the platform assembly from a floor level position to a pre-stowed position, and shortening the distance between the two vertical arms. In a preferred embodiment, the step of shortening the distance between the first and second vertical arms is accomplished by moving the second vertical arm towards the first vertical arm along a horizontal path. The platform preferably includes first and second platform sections that are pivotally connected.

DETAILED DESCRIPTION OF THE INVENTION

Although specific embodiments of the present invention will now be described with reference to the drawings, it should be understood that such embodiments are by way of example only and are merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
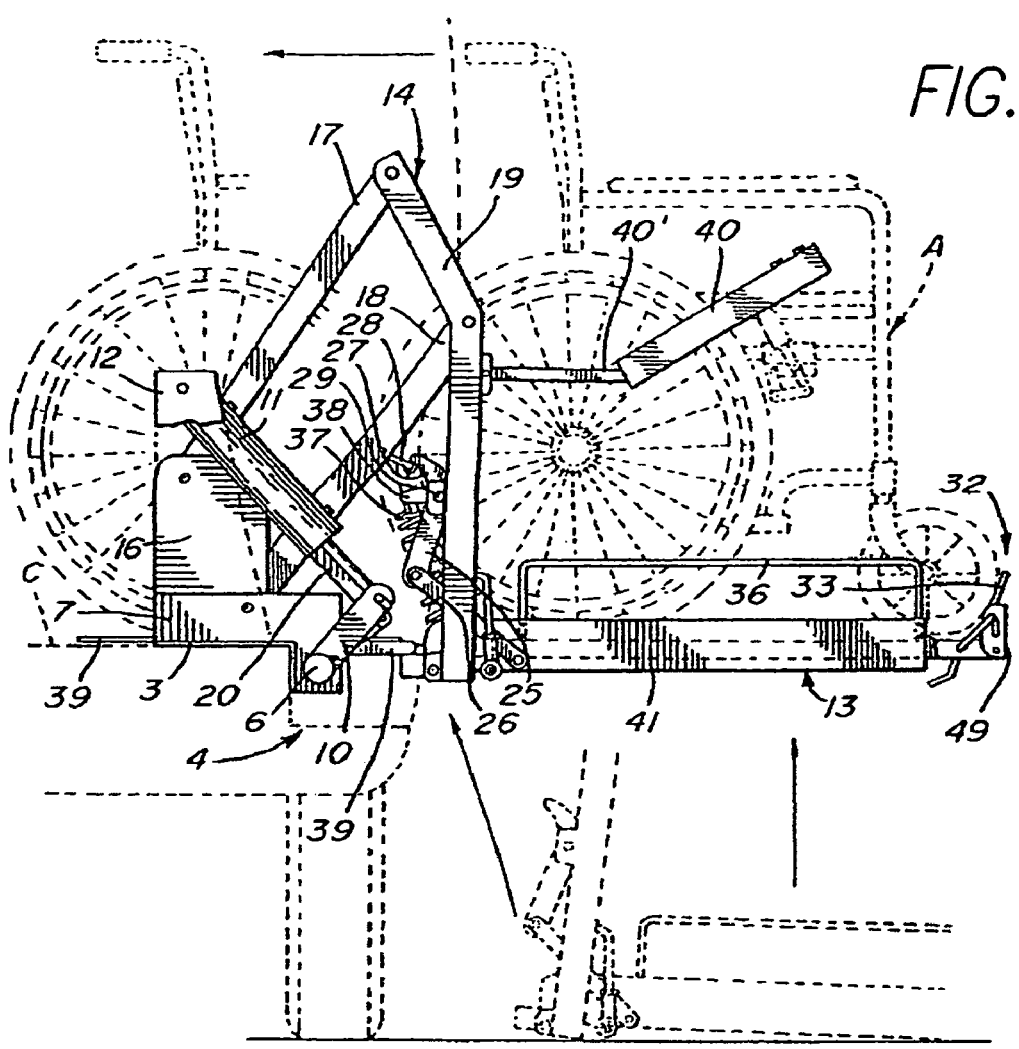
FIG. 1 is a side-view showing the lift assembly in a floor level position with the platform at the level of the vehicle floor in accordance with a first embodiment of the present invention.
Figure 2:
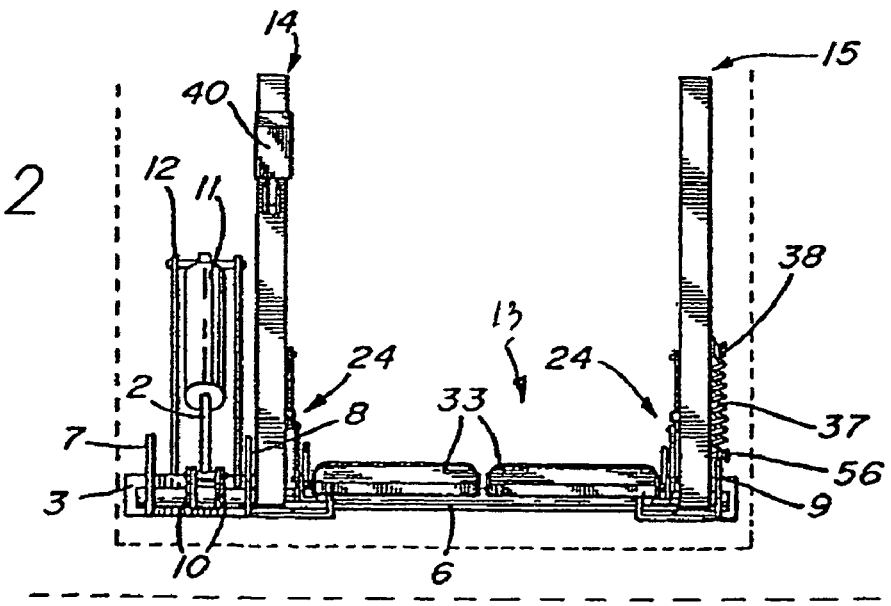
FIG. 2 is a front view of the lift assembly in the same position as in FIG. 1.

With reference to the drawings, and in particular to FIG. 1, the lift assembly is secured at the doorway of a vehicle 1, such as a van or the like, and comprises an anchoring plate 3 secured to the vehicle floor C and partially engaging in the cavity forming the floor board cavity 4, a transverse shaft 6 having a length comparable to the length of the anchoring plate 3, is rotatably supported in front of the latter alongside the section engaging in the floorboard cavity 4 by means of three brackets 7, 8, 9, (FIGS. 1, 2) respectively positioned at each of the extremities of the bar 6 and at an intermediate position near the double acting hydraulic cylinder 11 which is connected to the transverse shaft 6 by means of two parallel radial arms 10 secured to shaft 6.

The lift assembly is movable by a power actuating system. The actuating system may be controlled electrically, hydraulically or in any other conventional means known to one skilled in the art. For demonstration purposes only, a hydraulic actuating system is described herewith. The hydraulic actuating system includes a hydraulic pump (not shown), a hydraulic power unit (not shown), and a hydraulic cylinder 11. In an alternative embodiment the hydraulic actuating system can include a pair of opposed hydraulic cylinders.

The radial arms 10 are pivotally connected to the hydraulic cylinder piston rod 2 at a first extremity and welded to the transverse shaft 6 at the other extremity.

The hydraulic cylinder 11 is pivotally supported at its upper extremity by two bracket plates 12 upstanding from and secured to anchoring plate 3. In the present embodiment, the hydraulic cylinder 11 is located on the left side of the lift assembly (however, it could be located on the right side) and is used in conjunction with a fluid pump and tank (not shown) which can be installed anywhere in the vehicle.

A platform 13 is pivotally connected to the vehicle 1 by a pair of spaced armatures 14 and 15 (also referred to herein as first and second vertical arms) which are identical and each pivotally mounted to the anchoring plate 3 through armature brackets 16. Each of the armatures defines with bracket 16 a deformable parallelogram. Each armature is formed of two parallel links 17 and 18 and of a vertical link 19. The parallel links 17 and 18 are pivotally secured at one extremity to the armature bracket 16 and to the vertical link 19 at the other extremity. The lower parallel links 18 on both armatures 14 and 15 are connected to the transverse shaft 6 by means of an articulated linkage 20 (FIGS. 1 and 5) to displace the platform 13 under the action of hydraulic cylinder 11.

Because of the use of a transverse shaft 6, only one hydraulic cylinder is needed to operate the lift assembly; it is an advantage of the invention to use one cylinder because of the reduction in cost and size of the assembly. However, it will be understood that more than one hydraulic cylinder can be used to operate the lift assembly.

Figure 5:
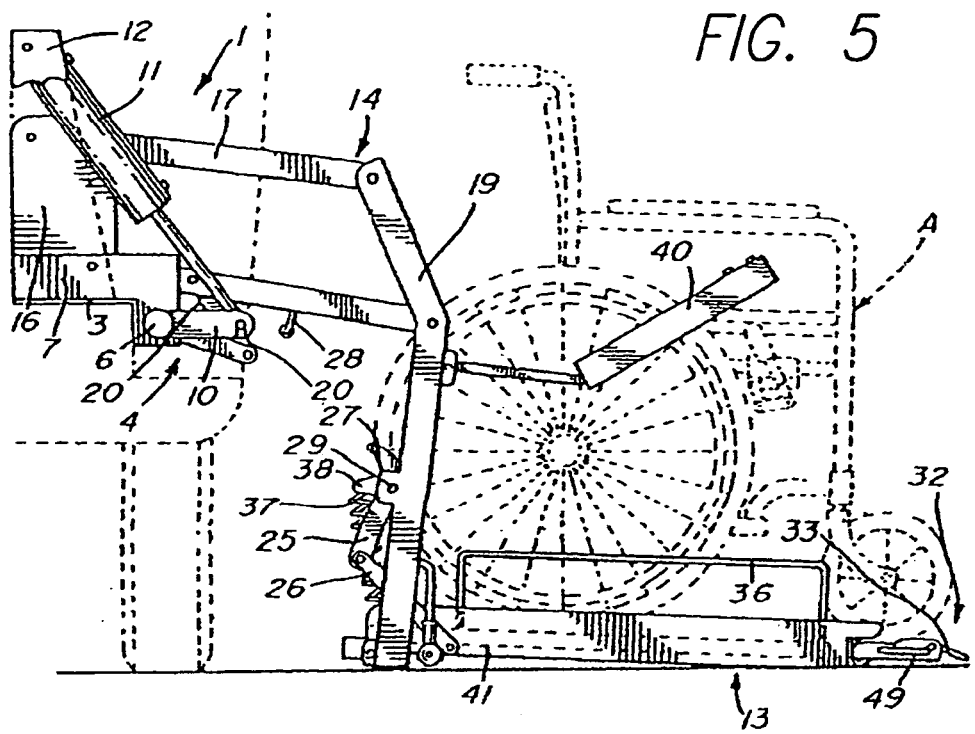
FIG. 5 is a side view of the lift assembly with the platform in a ground level position.
Figure 6:
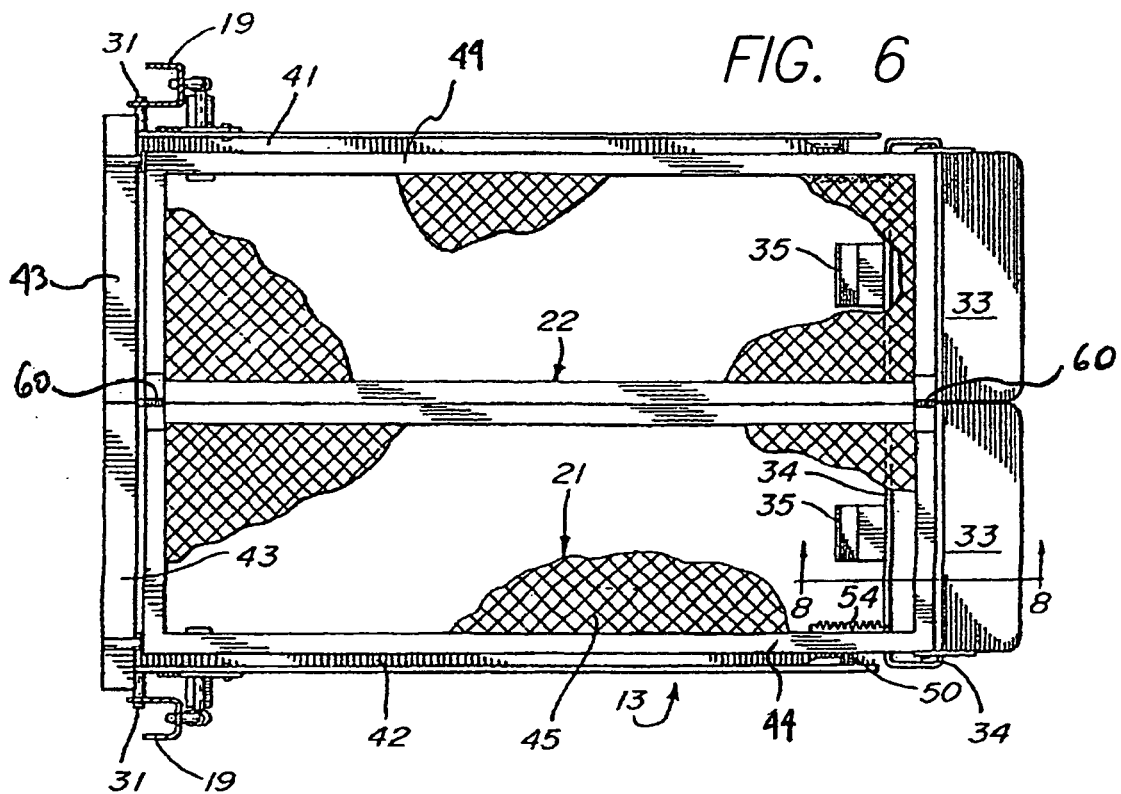
FIG. 6 is a top plan view of the platform assembly.
Figure 7:
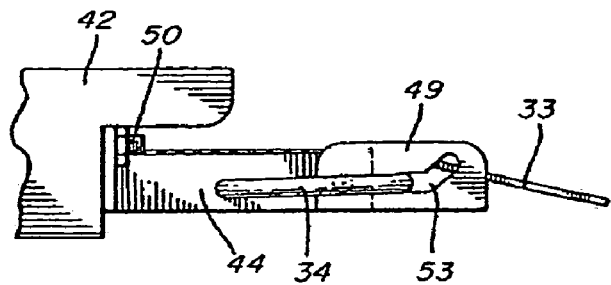
FIG. 7 is a fragmentary side view showing a front guard in its lowered position.

The platform 13 comprises a flat and rigid surface made of first and second separate sections 21 and 22 (FIG. 6) having a combined area sufficient to support a wheel chair A (FIGS. 1 and 5). In a preferred embodiment, the platform sections 21 and 22 are each formed of a frame 44 which supports a rigid mesh 45. In another embodiment, the platform sections can be a solid plate or the like. The platform 13 includes a transverse member 43 mounted in rotative relationship by pivot pins 31 in between the lower extremities of the vertical links 19 (FIG. 6), and two parallel longitudinally extending members 41 and 42 extending transversely from the extremities of the member 43.

The platform 13 is normally in a plane parallel to the ground when the lift assembly is in use. This is also referred to herein as the fully extended configuration. The fully extended configuration comprises both the ground level position (when the lift assembly is in a position such that a person in a wheelchair can roll from the ground onto the platform 13 or vice versa, as shown in FIG. 5) and the floor level position (when the lift assembly is in a position such that a person in a wheelchair can roll from the vehicle floor C onto the platform 13 or vice versa, as shown in FIG. 1). For storage, the platform 13 is raised to a vertical position (often referred to herein as the pre-stowed position) and then collapsed along a horizontal path into a stowed position to reduce the storage size and then shifted within the vehicle 1 to allow closing of the vehicle door B (see FIG. 3).

In conventional lifts, the door opening is blocked by the raised platform while in the present invention the platform comprises first and second sections 21 and 22 pivotally connected in the middle by a hinge or hinges 60 or the like.

The platform 13 is moveable in between a vertical plane and a horizontal plane by means of a pair of articulated linkages 24 each having two links 25, 26 (see FIGS. 1 and 5) pivotally secured together and installed in between the vertical links 19 and the parallel members 41 and 42 on each side of the lift assembly.

The upper members 25 are ended by a curved section 27. When the platform 13, during its upward movement, has reached its floor level position, the curved sections 27 abut on a short rod 28 located on the underside of the lower parallel links 18 causing the rotation of the members 25 around the axis 29 and the displacement of the lower links 26 which pull on the platform 13 to pivot the platform 13 upwardly.

Barriers are installed around the platform 13 as a security measure to prevent the user from falling (see FIGS. 1, 5, 6 and 7).

Lateral barriers 36 upwardly extend from and are fixed to the parallel members 41 and 42; and front barriers 32 are pivotally secured to the front edge of the frames 44 and each comprises a protection plate 33, a pair of guiding plates 49 pivotally secured at 49' on either sides of the frame 44 and supporting the plate 33. A rod 34 having its extremities slidably secured in slots 53 of the guide plates 49, forms a loop pivotally supported by the frame 44. A striking plate 35 is fixed to the center of the loop formed by rod 34.

Each protection plate 33 is biased to an upward position by means of a tension spring 54 which is secured at its ends to the frame 44 and to a small pin 55 transversely mounted on the rod 34.

Figure 8:
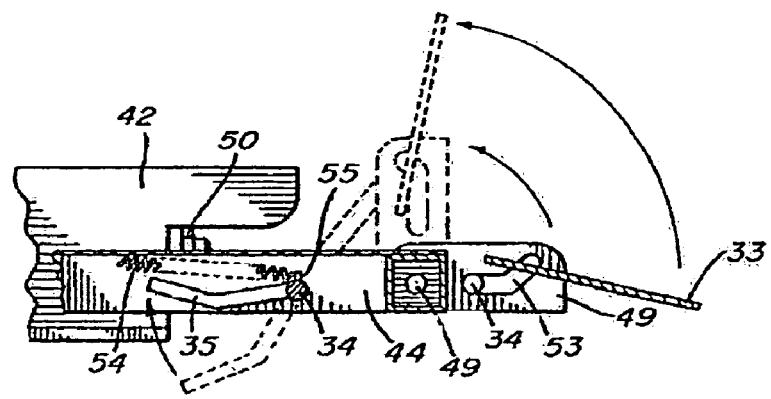
FIG. 8 is a sectional view of a front guard taken on line 8-8 of FIG. 6.

When protection plate 33 is in an upward position, striking plate 35 protrudes from the underside of frame 44 as shown in dotted lines in FIG. 8. When the platform 13 is lowered to ground level, striking plate 35 abuts the ground and pivots protection plate 33 to a lowered ground engaging position, shown in full lines in FIGS. 7 and 8, to permit passage of the wheel chair A.

A bridge plate or ramp 39 is used to bridge the gap between the platform 13 and the vehicle floor C when the platform 13 is horizontal and level with the vehicle floor. The bridge plate 39 is preferably pivotally attached to the anchoring plate 3 (attached to vehicle floor). It does not travel up and down with the platform 13. It always stays at vehicle floor level. When the platform 13 is stowed, the bridge plate 39 pivots vertically, and folds into three sections to wrap around the platform 13.

The first and second sections 21 and 22 remain co-planar when the platform 13 moves between the ground level position, floor level position and pre-stowed position. As discussed above, platform sections 21 and 22 are pivotally connected. This connection allows platform 13 to fold/collapse to allow the lift assembly to go from the pre-stowed position to the stowed position. In a preferred embodiment, transverse shaft 6 also includes a joint and is foldable. However, this is not a limitation on the present invention. It will be understood that any method for collapsing the first and second vertical arms 14 and 15 is within the scope of the present invention. For example, the second vertical arm 15 may be movable toward the first vertical arm 14 (or the first and second vertical arms may be movable toward one another) via rollers, a track, sliding, a foldable mechanism, telescoping members, etc. Furthermore, it is anticipated that this collapsing can be done manually or automatically, for example, hydraulically, electrically, pneumatically, etc. The platform 13 may include more than 2 foldable sections.

Figure 9:
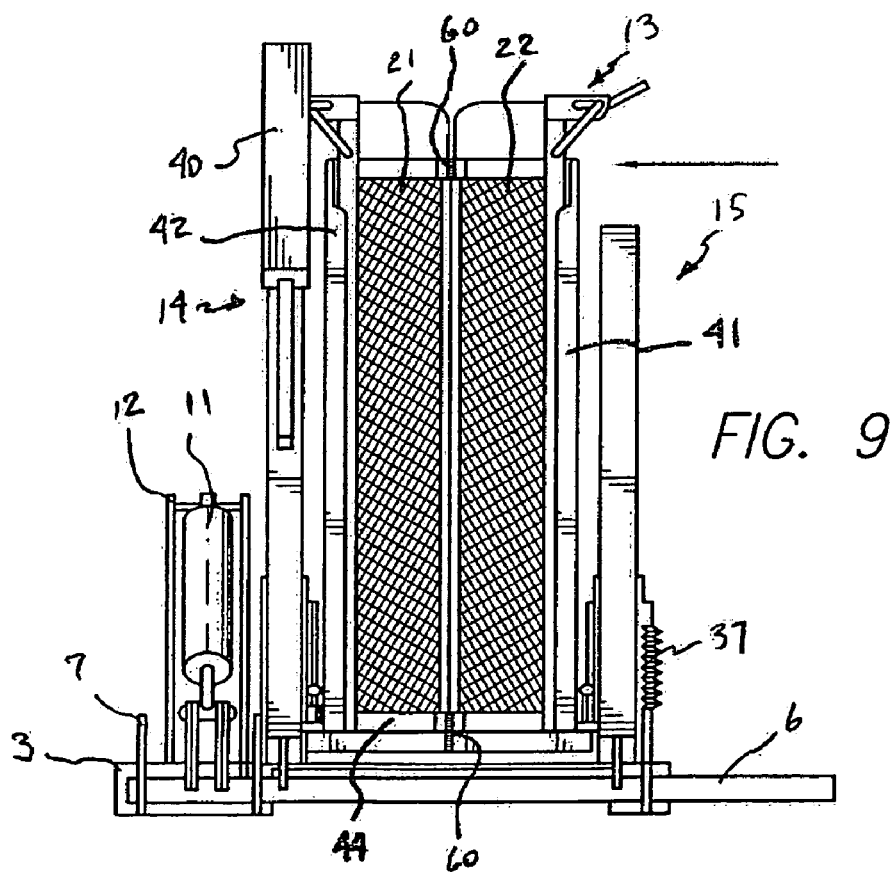
FIG. 9 is a front view of the present invention showing the lift assembly in a mid-stowed position.
Figure 11:
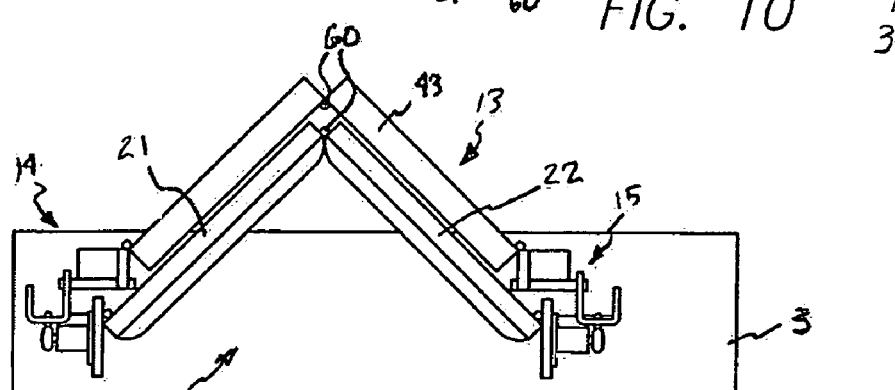
FIG. 11 is a top view of the present invention showing the lift assembly in a mid-stow position.

In a preferred embodiment, second vertical arm 15 is movable via rollers and a track. Anchoring plate 3 includes at least one track that corresponds to at least one roller on armature bracket 16. In a preferred embodiment, a plurality of tracks and rollers are used. For example, the track assembly, rollers and movable tower from commonly owned, and concurrently filed U.S. patent application Ser. No. 11/374,360 titled Slidably Collapsible Two-Arm Wheelchair Lift, filed on Feb. 3, 2006, could be used. This allows vertical arm 15 to be pushed or pulled toward vertical arm 14, thereby causing platform 13 to fold, as is shown in FIGS. 9 and 11.

Figure 10:
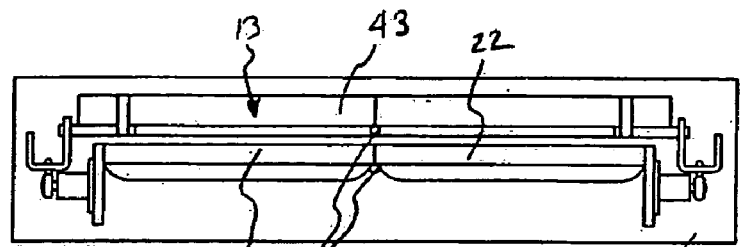
FIG. 10 is a top view of the present invention showing the lift assembly in a pre-stowed position.

As the vertical arm 15 is pushed or pulled toward vertical arm 14, the longitudinal fold between platform sections 21 and 22, including hinges 60 causes the platform 13 to begin to fold, as shown in FIG. 10. This drives the platform assembly to the stowed position, as shown in FIG. 12.

The stowing of the platform could be driven by a double acting hydraulic cylinder, a motor-chain drive, a motor and cable, a motor and toothed belt. With the exception of the hydraulic cylinder, these drive mechanisms work similar to a motorized driveway gate. Similarly, the system could use an electric clutch mechanism release the drive for manual operation.

Figure 4:
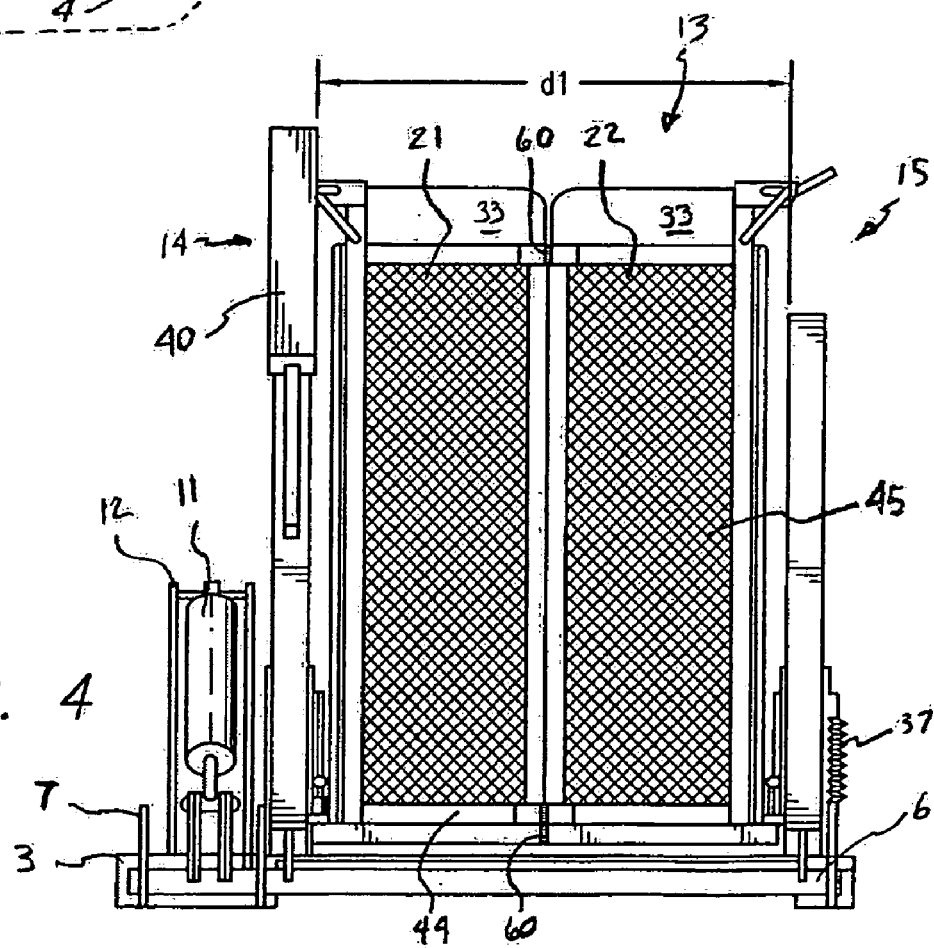
FIG. 4 is a front view showing the lift assembly in a pre-stowed position.
Figure 12:
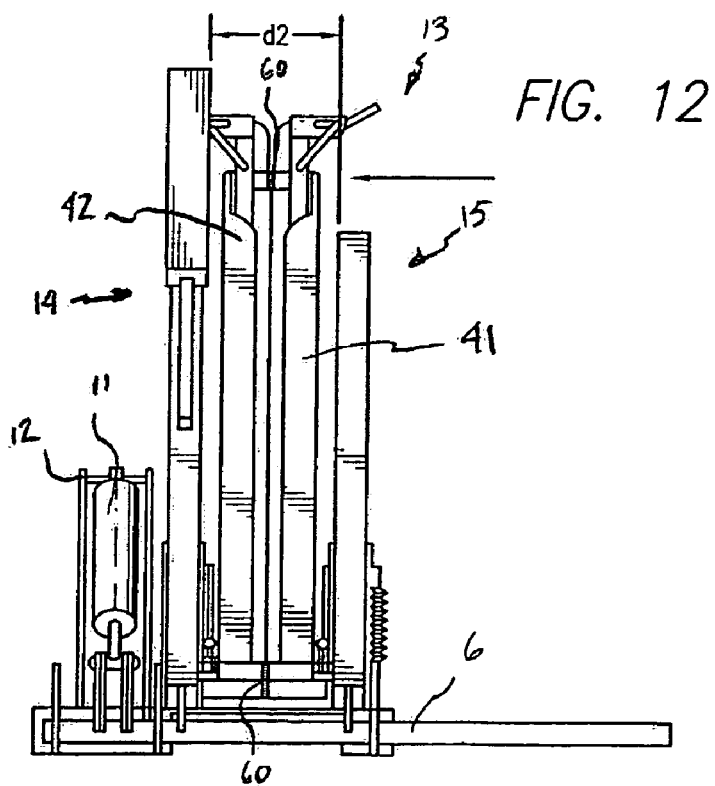
FIG. 12 is a front view of the lift assembly in a stowed position.

As can be seen in FIG. 12, in the stowed position, first and second sections 21 and 22 are substantially parallel. As used herein substantially parallel does not mean exactly parallel. As can be seen in FIG. 12, the first and second sections 21 and 22 are much closer to being parallel than they are co-planar. Also as can be seen in FIG. 12, in the stowed position, the first and second vertical arms 14 and 15 are a second distance apart d2. D2 is lesser than d1 (see FIG. 4).

When the lift assembly is moved out from its pre-stowed position, means are needed to help the frame section 23 rotate from an upstanding position to a horizontal position (or fully extended configuration).

These means are installed on the armature 15 (see FIGS. 1 and 2) and comprise a tension spring 37 secured at one extremity to a support 38 extending from the curved section 27 of the upper link 25 and at the other extremity to a hook 56 secured to the lower section of the vertical member 19.

The spring 37 forces the articulated linkage 24 to rotate the platform 13 downwardly.

In a preferred embodiment, a control box 40 is secured to an arm 40' (see FIGS. 1 and 3), which is pivotally secured to one of the two vertical links 19 being moveable between operative and stored position. Box 40 carries control buttons electrically connected to an electrical circuit for the control of a hydraulic circuit (not shown), including a hydraulic pump and the hydraulic cylinder 11. Control box 40 permits the user to operate the lift assembly alone.

Figure 3:
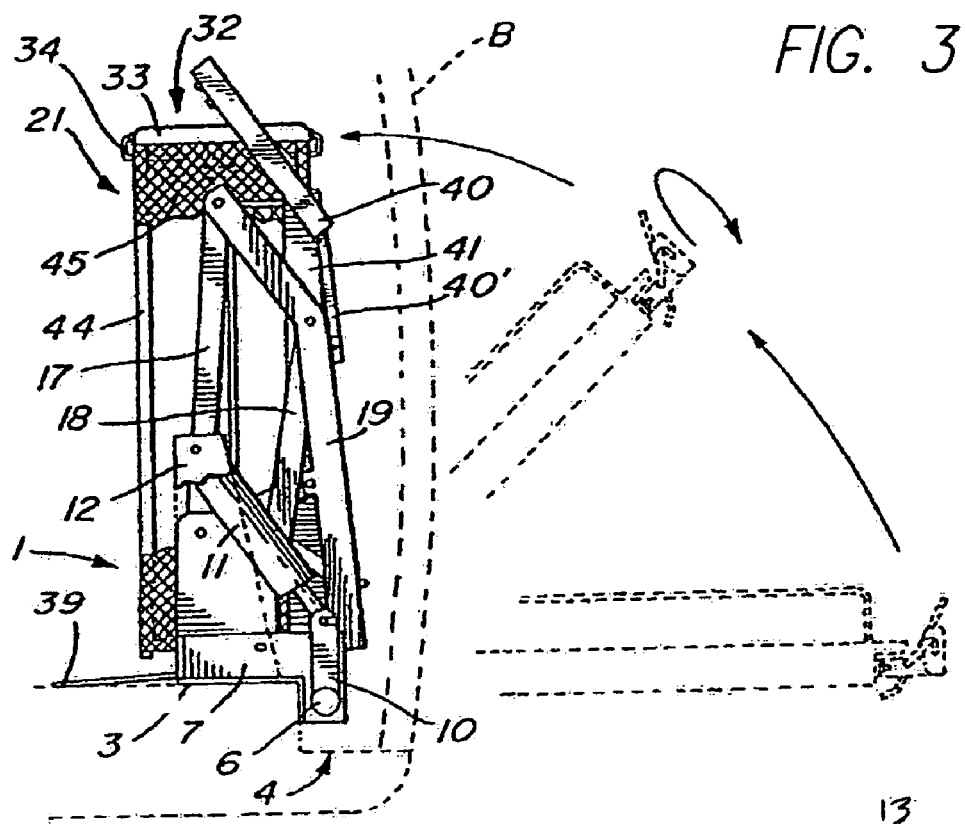
FIG. 3 is a side view of the lift assembly shown in stowed position.

As shown in FIG. 3, when the lift assembly is in the stowed position, it completely clears the conventional sliding door B of the vehicle.

Defined broadly, the present invention is a wheelchair lift assembly for use in conjunction with a vehicle having an opening that is movable between a fully extended configuration (including a ground level position and a floor level position), a pre-stowed position and a stowed position.

In a preferred embodiment, the wheelchair lift includes a power actuating system and a platform assembly having at least two plates (or sections) that are pivotable between a horizontal position (the fully extended configuration) where the plates lie in the same plane and a vertical position (the pre-stowed position) where the plates are substantially coplanar and a vertical position (the stowed position) where the plates are adjacent one another. The platform assembly is connected to the power actuating system by a linkage assembly (including the first and second vertical arms). The platform sections or plates are carried by the first and second vertical arms, respectively. In the horizontal position (the fully extended configuration) and the first vertical position (the pre-stowed position) the arms are a first distance apart, and in the second vertical position (the stowed position) the arms are a second distance apart. The second distance is lesser than the first distance.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A wheelchair lift for use in conjunction with a vehicle having a floor, the lift comprising:
a power actuating system,
a platform assembly having first and second platform sections joined by a hinge,
wherein the platform assembly is movable between a fully extended configuration, a pre-stowed position, and a stowed position,
a linking assembly connecting the power actuating system to the platform assembly, the linking assembly having first and second vertical arms connected to the first and second platform sections, respectively, each vertical arm spaced from the other and from the hinge therebetween in the fully extended and pre-stowed positions, said vertical arms arranged for raising the platform assembly between the fully extended configuration and the pre-stowed position,
wherein, when the platform assembly is in the extended position the arms are spaced apart with the platform assembly therebetween and after the lift has been raised to the pre-stowed position, at least one of the vertical arms is movable toward the other vertical arm to the stowed position.

2. The wheelchair lift of claim 1 wherein the second vertical arm is movable toward the first vertical arm along a horizontal path.

3. The wheelchair lift of claim 1, wherein the first and second platform sections are co-planar and lie in a substantially horizontal position when the platform assembly is in the fully extended configuration, and wherein the first and second platform sections are substantially parallel and lie in a substantially vertical position when the platform assembly is in the stowed position.

4. The wheelchair lift of claim 3 wherein the first and second platform sections are adjacent to one another when the platform assembly is in the stowed position.

5. The wheelchair lift of claim 4 wherein the second vertical arm is movable toward the first vertical arm along a horizontal path.

6. The wheelchair lift of claim 3 wherein the first and second platform sections lie in a substantially vertical position and are co-planar when in the pre-stowed position.

* * * * *